United States Patent
Qiang et al.

(10) Patent No.: US 9,237,527 B2
(45) Date of Patent: Jan. 12, 2016

(54) POWER CONTROL

(75) Inventors: Jian Feng Qiang, Beijing (CN); Peter Skov, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 417 days.

(21) Appl. No.: 13/498,603

(22) PCT Filed: Sep. 30, 2009

(86) PCT No.: PCT/EP2009/062689
§ 371 (c)(1),
(2), (4) Date: Mar. 28, 2012

(87) PCT Pub. No.: WO2011/038761
PCT Pub. Date: Apr. 7, 2011

(65) Prior Publication Data
US 2012/0188974 A1  Jul. 26, 2012

(51) Int. Cl.
*H04W 4/00* (2009.01)
*H04W 52/14* (2009.01)
*H04W 52/24* (2009.01)

(52) U.S. Cl.
CPC .......... *H04W 52/146* (2013.01); *H04W 52/241* (2013.01); *H04W 52/248* (2013.01)

(58) Field of Classification Search
CPC .................................................. H04W 52/22
USPC ........................................................ 370/329
See application file for complete search history.

(56) References Cited

U.S. PATENT DOCUMENTS

| 7,532,723 | B2* | 5/2009 | Chitrapu et al. ................. 380/44 |
| 8,059,571 | B2* | 11/2011 | Sen et al. ....................... 370/311 |
| 2004/0023627 | A1 | 2/2004 | Osaki et al. .................... 455/130 |
| 2005/0196176 | A1* | 9/2005 | Sun et al. ....................... 398/152 |
| 2011/0136523 | A1* | 6/2011 | Kim et al. ....................... 455/501 |
| 2011/0158402 | A1* | 6/2011 | Sichitiu et al. ................. 380/42 |
| 2012/0009962 | A1* | 1/2012 | Liu et al. ....................... 455/509 |
| 2014/0134953 | A9* | 5/2014 | Rangan et al. ............... 455/63.1 |

FOREIGN PATENT DOCUMENTS

EP   1 067 706 A1   1/2001

OTHER PUBLICATIONS

3GPP TS 36.212, V8.7.0 (May 2009), "$3^{rd}$ Generation Partnership Project; Technical Specification Group Radio Access Network; Evolved Universal Terrestrial Radio Access (E-UTRA); Multiplexing and channel coding (Release 8)", Section 5.3.3, 2 pgs.
3GPP TS 36.213, V8.7.0 (May 2009), "$3^{rd}$ Generation Partnership Project; Technical Specification Group Radio Access Network; Evolved Universal Terrestrial Radio Access (E-UTRA); Physical layer procedures (Release 8)", Sections 5.1.1.1 and 5.1.1.2, 5 pgs.

* cited by examiner

*Primary Examiner* — Dang Ton
*Assistant Examiner* — Nourali Mansoury
(74) *Attorney, Agent, or Firm* — Harrington & Smith

(57) ABSTRACT

Deciding a power control command for transmitting to a communication device, wherein the deciding takes into account a signal distortion characteristic of the communication device, and wherein the power control command is for use by communication device in determining a transmission power for the communication device.

15 Claims, 4 Drawing Sheets

POWER CONTROL

The present invention relates to controlling the radio transmission power of a communication device in a communication system. In particular, it relates to closed-loop power control, wherein a communication device receives power control commands decided at least partly on the basis of measurements of signal quality made a at a receiver of transmissions from the communication device.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

In a cellular radio access network, the receipt of transmissions from one user equipment can be subject to interference from transmissions made by other user equipments in the same cell or in adjacent cells. Similarly, the transmissions from one user equipment can cause interference with transmissions from other user equipments in the same cell or adjacent cells. One aim of controlling the transmission power of transmissions from user equipment is to balance the need for sufficient transmitted energy to achieve a required quality of service for that user equipment against the need to minimise interference to other users of the system.

One aim of the present invention is to provide better control over achieving a balance between improving the quality of service for user equipment and (i) reducing interference with the transmissions of other user equipments and/or (ii) increasing the efficiency of power use at the user equipment.

The present invention provides a method, comprising: deciding a power control command for transmitting to a communication device, wherein the deciding takes into account a signal distortion characteristic of the communication device, and wherein the power control command is for use by the communication device in determining a transmission power for the communication device.

The present invention also provides an apparatus configured to decide a power control command for transmitting to a communication device, wherein the deciding takes into account a signal distortion characteristic of the communication device, and wherein the power control command is for use by the communication device in determining a transmission power for the communication device.

In one embodiment, information about said signal distortion characteristic of the communication device is received from the communication device.

In one embodiment, the transmission of a command to increase power is decided against if it is determined that an increase in transmission power at the communication device would not deliver at least a predetermined increase in signal-to-noise ratio at a receiver.

In one embodiment, the signal distortion characteristic of the communication device defines a maximum signal-to-noise ratio for a signal from the communication device, and the transmission of a command to increase power is decided against if it is determined that a signal-to-noise ratio of a signal received at a receiver from the communication device is already less than a predetermined amount below said maximum.

In one embodiment, the deciding also takes into account a level of noise at a receiver that is generated at sources other than the communication device.

In one embodiment, the power control command relates to transmission from the communication device on a physical uplink control channel or on a physical uplink shared channel.

In one embodiment, the decided power control command is transmitted to the communication device.

In one embodiment, the power control command is a single-bit command or a 2-bit command.

In one embodiment, the decided power control command is transmitted as part of one of the following sets of information: (i) information used for scheduling of a physical uplink shared channel; and (ii) information used for the scheduling of a physical downlink shared channel codeword.

In one embodiment, the decided power control command is transmitted as one of a plurality of power control commands for a physical uplink control channel or a physical uplink shared channel.

In one embodiment, the decided power control command is transmitted to the communication device on a physical downlink control channel.

In one embodiment, the decided power control command is used by the communication device in determining the average power over which a single-carrier frequency domain multiple access symbol.

In one embodiment, the power control command is received at the communication device, and the power control command is used in determining a transmission power for the communication device.

The present invention also provides a method comprising: generating a message for sending from a communication device to a radio access network node, wherein the message includes information about a signal distortion characteristic of the communication device, wherein the signal distortion characteristic is for use by the radio access network node in deciding a power control command for transmitting to the communication device.

The present invention also provides an apparatus configured to: generate a message for sending from a communication device to a radio access network node, wherein the message includes information about a signal distortion characteristic of the communication device, wherein the signal distortion characteristic is for use by the radio access network node in deciding a power control command for transmitting to the communication device.

In one embodiment, the message is sent from the communication device to the radio access network node.

The present invention also provides an apparatus comprising: a processor and memory including computer program code, wherein the memory and the computer program code are configured to, with the processor, cause the apparatus at least to perform any of the above-described methods.

The present invention also provides a computer program product comprising program code means which when loaded into a computer controls the computer to perform any of the above-described methods.

The present invention also provides a system comprising: a communication device and a radio access network node; wherein the communication device is configured to send to the radio access network node a message including information about a signal distortion characteristic of the communication device; the radio access network node is configured to use said information in deciding a power control command for the communication device and to send said power control command to the communication device; and wherein the communication device is further configured to use the power control command in determining a transmission power for the communication device.

Hereunder an embodiment of the present invention will be described, by way of example only, with reference to the following drawings, in which:

FIGS. 1, 2 and 3 show respectively the communication system or network, an apparatus for communication within the network, and an access node of the communications network.

Figure 1:
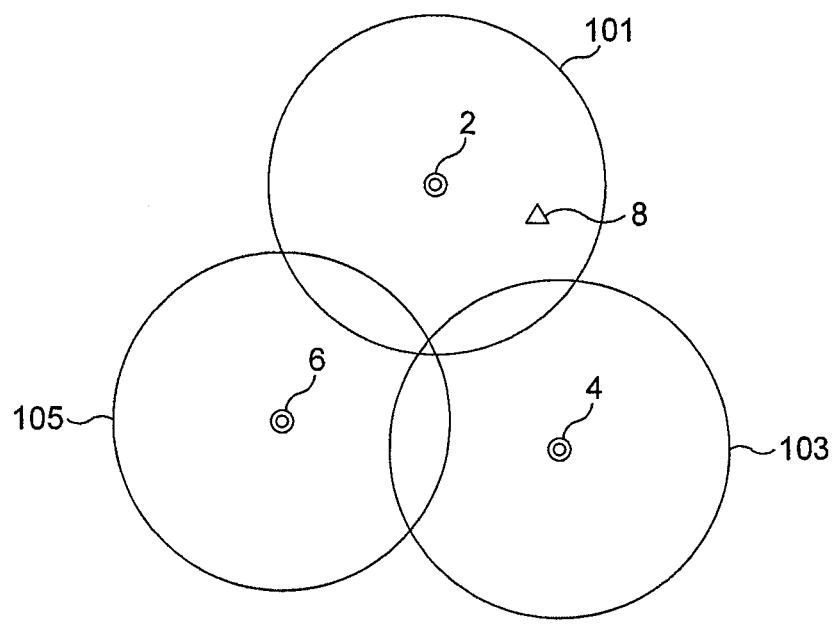
FIG. 1 illustrates a radio access network within which an embodiment of the invention may be implemented, which access network includes a number of cells each served by a respective base station (eNodeB)

FIG. 1 shows a communications system or network comprising a first access node 2 with a first coverage area 101, a second access node 4 with a second coverage area 103 and a third access node 6 with a third coverage area 105. Furthermore FIG. 1 shows user equipment 8 which is configured to communicate with at least one of the access nodes 2, 4, 6. These coverage areas may also be known as cellular coverage areas or cells where the access network is a cellular communications network.

Figure 2:
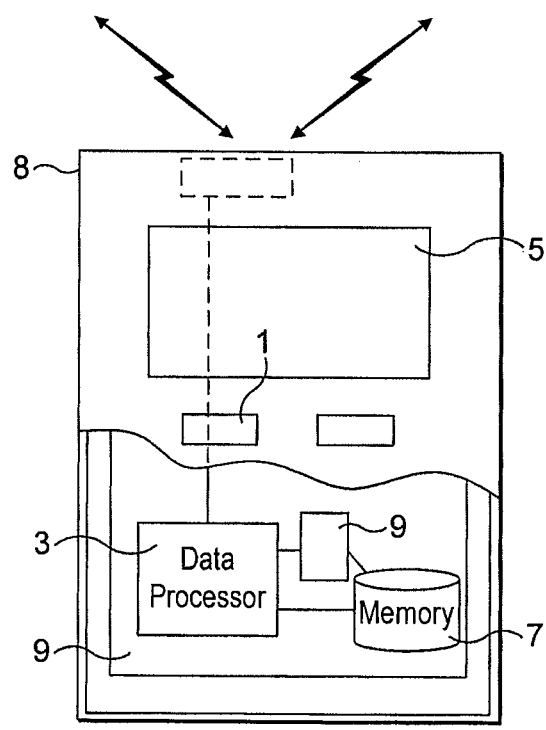
FIG. 2 illustrates a user equipment shown in FIG. 1 in further detail.

FIG. 2 shows a schematic partially sectioned view of an example of user equipment 8 that may be used for accessing the access nodes and thus the communication system via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

As can be seen with respect to FIG. 1, the UE 8 may be configured to communicate with at least one of a number of access nodes 2, 4, 6, for example when it is located in the coverage area 101 of a first access node 2 the apparatus is configured to be able to communicate to the first access node 2, when in the coverage area 103 of a second node 4 the apparatus may be able to communicate with the second access node 4, and when in the coverage area 105 of the third access node 6 the apparatus may be able to communicate with the third access node 6.

Figure 3:
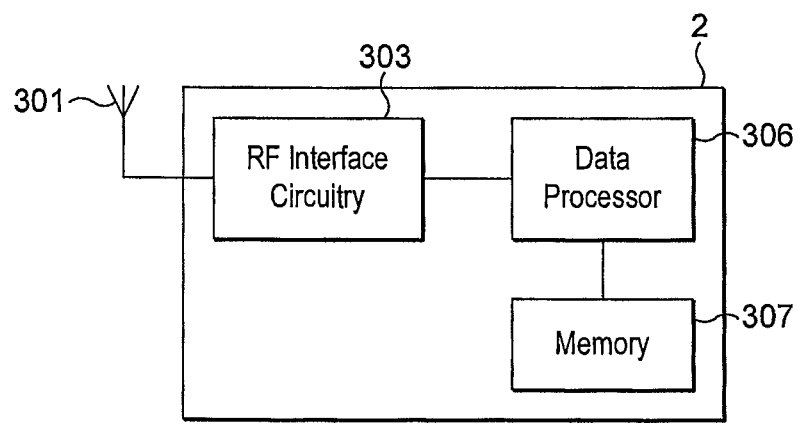
FIG. 3 illustrates an apparatus suitable for implementing an embodiment of the invention at an access node or base station of the radio network shown in FIG. 1.

FIG. 3 shows an example of the first access node, which in this embodiment of the invention is represented by an evolved node B (eNB) 2. The eNB 2 comprises a radio frequency antenna 301 configured to receive and transmit radio frequency signals, radio frequency interface circuitry 303 configured to interface the radio frequency signals received and transmitted by the antenna 301 and the data processor 167. The radio frequency interface circuitry may also be known as a transceiver. The access node (evolved node B) 2 may also comprise a data processor configured to process signals from the radio frequency interface circuitry 303, control the radio frequency interface circuitry 303 to generate suitable RF signals to communicate information to the UE 8 via the wireless communications link. The access node further comprises a memory 307 for storing data, parameters and instructions for use by the data processor 305.

It would be appreciated that both the UE 8 and access node 2 shown in FIGS. 2 and 3 respectively and described above may comprise further elements which are not directly involved with the embodiments of the invention described hereafter.

Although the following describes an embodiment of the invention using evolved node B (eNB) apparatus operating within an EUTRAN, further embodiments of the invention may be performed in any base station, node B and evolved node B suitable for communicating with a user equipment capable of communication in that access network, and further comprising data processing and storage capacity suitable for carrying the operations as described below.

An embodiment of the present invention is described below in the context of a LTE (Long term Evolution)—Release 8 system that employs Single Carrier—Frequency Division Multiple Access (SC-FDMA) for uplink transmissions from the UE 8 to the access node 2. However, the present invention is also of use in other systems, such as systems that use WCDMA for uplink transmissions.

In the LTE system—Release 8, UE 8 makes transmissions on a physical uplink shared channel (PUSCH) and a physical uplink control channel (PUCCH). The UE 8 is configured to control the average power over a SC-FDMA symbol in which the physical channel is transmitted.

The determination of transmit power at the UE 8 takes into account single-bit or 2-bit transmission power control (TPC) commands received at the user equipment from eNode B 2 on a physical downlink control channel (PDCCH). The received TPC commands are mapped at the UE 8 into UE specific correction values $\delta_{PUSCH}$ [dB]. A single-bit TPC command would have one of two values, which map onto a respective one of two pre-determined $\delta_{PUSCH}$ values; and a two-bit command would have one of four values which map onto a respective one of four pre-determined $\delta_{PUSCH}$ values.

The setting of the UE Transmit power for a PUSCH or PUCCH transmission in a specific transmission subframe i is defined by a respective formula, which includes one or more UE specific correction values $\delta_{PUSCH}$ as variable(s). Examples of formulae for the setting of UE Transmit power for PUSCH and PUCCH are set out at Sections 5.1.1.1 and 5.1.1.2 of 3GPP TS 36.213 V.8.7.0 (2009-05).

TPC commands are sent by the eNodeB 2 as part of one or more Das (downlink control information) on a physical downlink control channel (PDCCH). A DCI transports control information for one UE. The UE to which the DCI relates is identified in the DCI by a radio network temporary identifier (RNTI). The RNTI is allocated to the UE by the UTRAN and used as a UE identifier to exchange signalling messages between the UTRAN and the UE.

A DCI has one of a plurality of possible formats. DCI formats that are used for sending information including TPC commands are: DCI Format 0 which is used for the scheduling of PUSCH and includes a 2-bit TPC command for PUSCH; DCI Formats 1A, 1B and 1D which are used for the scheduling of one PDSCH codeword and include a 2-bit TPC command for PUCCH; DCI formats 2 and 2A, which include a 2-bit TPC command for PUCCH; Format 3 which is used for the transmission of TPC commands for PUCCH and PUSCH with 2-bit power adjustments; and Format 3A which is used for the transmission of TPC commands for PUCCH and PUSCH with single bit power adjustments. More information about these formats can be found at Section 5.3.3 of 3GPP TS 36.212 V. 8.7.0 (2009-05). For PUSCH power control, the TPC command is included in a PDCCH with DCI format 0 or jointly coded with other TPC commands in a PDCCH with DCI format 3/3A whose CRC (cyclic redundancy prefix) bits are scrambled with the an RNTI for the UE 8. The UE 8 attempts to decode a PDCCH of DCI format 0 with the UE's RNTI and a PDCCH of DCI format 3/3A with the UE's RNTI in every subframe except when in discontinuous reception (DRX). If DCI format 0 and DCI format 3/3A are both detected in the same subframe, then the UE uses the $\delta_{PUSCH}$ specified in DCI format 0. For PUCCH power control, the TPC command is included in a PDCCH with DCI format 1A/1B/1D/1/2A/2 or sent jointly coded with other TPC commands on a PDCCH with DCI format 3/3A whose CRC (cyclic redundancy prefix) bits are scrambled with the an RNTI for the UE. The UE 8 obtains the TPC commands by attempting to decode a PDCCH of DCI format 3/3A with the UE's RNTI and one or several PDCCHs of DCI format 1A/1B/1D/1/2A/2 with the UE's RNTI in every subframe except when in discontinuous reception (DRX). If the UE decodes a PDCCH with DCI format 1A/1B/1D/1/2A/2 and the corresponding detected RNTI equals an RNTI of the UE, the UE uses the $\delta_{PUSCH}$ specified in that PDCCH. If not and the UE decodes a PDCCH with DCI format 3/3A, the UE uses the $\delta_{PUSCH}$ provided in that PDCCH.

The TPC commands are decided by the UTRAN taking into account information it has received from the UE 8 about the level to which imperfections in the RF parts of the UE 8 introduce distortion into a signal. The distortion in a UE signal can be modelled as noise with a nonlinear dependency on the transmission power. Where the UTRAN (including eNode B 2) determines (a) that a higher signal-to noise ratio (SINR) is desirable, but also (b) that the level of noise calculated to originate from the UE 8 in comparison with the level of noise from other sources (such as noise originating from user equipments making transmissions on one or more of the same subcarriers in adjacent cells 103, 105) is so high that an increase in transmission power at the UE 8 would not deliver at least a predetermined level of increase in the SINR detected at the eNodeB 2, the UTRAN decides not to send an power increase command.

In more detail, hardware imperfections at the UE 8 can impose an upper limit on the received SINR level at eNodeB 2. According to an embodiment of the invention, the UE 2 sends information of its hardware imperfections to its serving base station, eNodeB 2, and the eNodeB 2 refrains from sending any power increase command to the UE 2 if the eNodeB 2 determines from the hardware imperfection information that the received SINR is already close to the upper limit, such as less than a predetermined amount (e.g. −3 dB) below the upper limit. It is thus possible to prevent hardware imperfections at the UE 2 resulting in inefficient transmission power increases, i.e. power increases that do not produce an increase in SINR at the eNodeB 2 receiver but have the undesirable effect of using battery power and increasing interference for other users.

Figure 4:
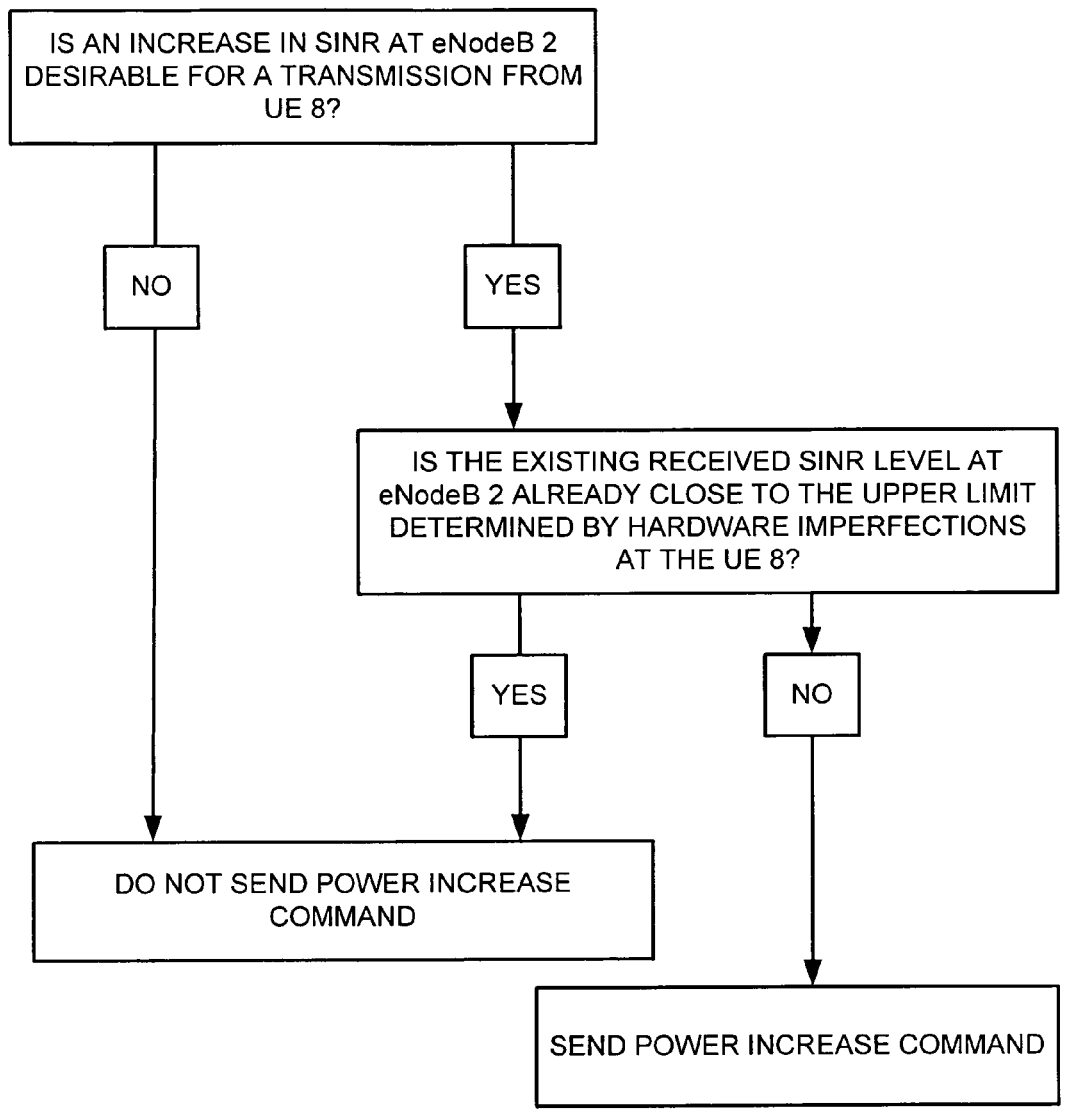
FIG. 4 illustrates an operation of the access network in accordance with an embodiment of the present invention.
Figure 5:
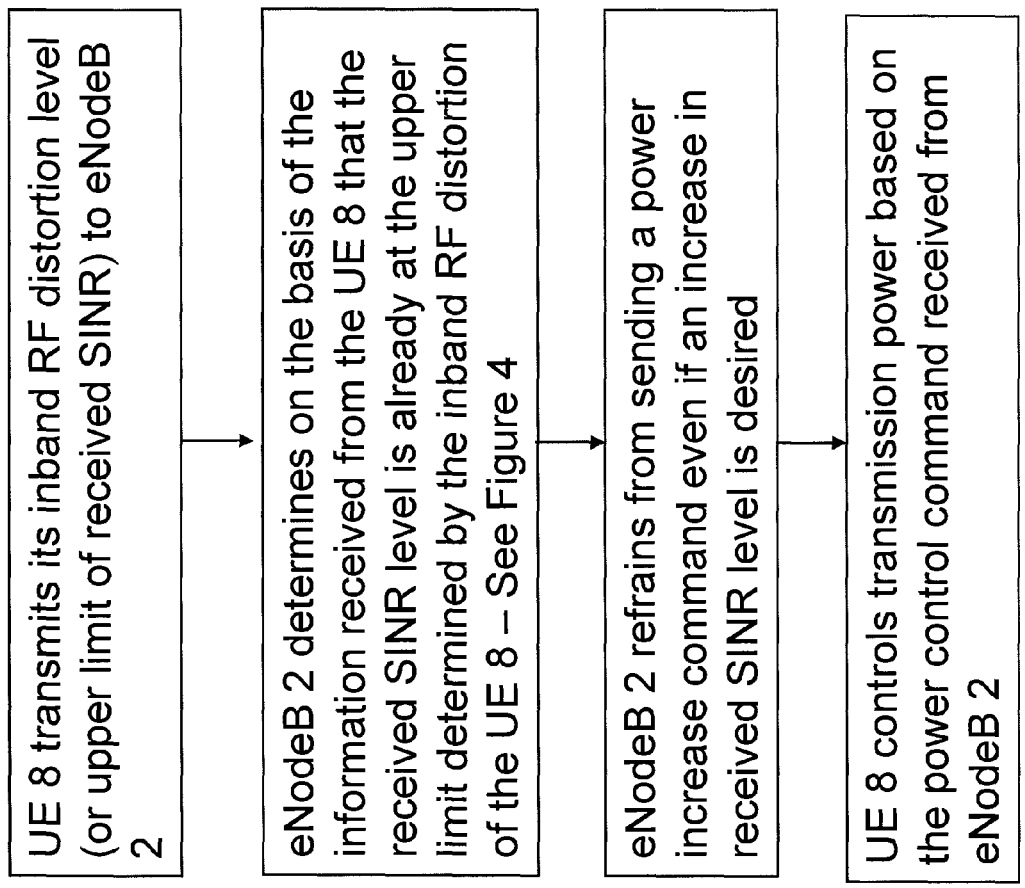
FIG. 5 illustrates the combined actions of the user equipment and radio access network in accordance with an embodiment of the present invention.

This transfer of hardware imperfection information from the UE 2 to the eNodeB 2 and the subsequent operations at the eNodeB 2 are illustrated by the flowcharts of FIGS. 4 and 5. The above-described technique according to an embodiment of the present invention provides a way of differentiating between low-performance and high-performance UE devices. A UE device with high transmitter distortion may be subject to greater limits on the level of SINK (and therefore quality of service) that it is permitted to achieve compared to a UE device with lower transmitter distortion. The above-described technique can also better increase the efficiency of battery use at a UE device in return for no more than a relatively small (if any) decrease in quality of service.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
   receiving, wirelessly from a communication device, information about a signal transmission distortion characteristic of the communication device, wherein the information indicates how hardware imperfections of the communication device introduce distortion into a transmitted signal; and
   deciding a power control command for wirelessly transmitting to the communication device, wherein the deciding takes into account the signal transmission distortion characteristic of the communication device, wherein the signal distortion characteristic of the communication device defines a maximum signal-to-noise ratio for a signal from the communication device, and comprising deciding against a transmission of a command to increase power if it is determined that a signal-to-noise ratio of a signal received at a receiver from the communication device is already less than a predetermined amount below said maximum, wherein the decided power control command is transmitted as part of downlink control information to the communication device, and wherein the power control command is for use by the communication device in determining a transmission power for the communication device.

2. The method of claim 1, comprising deciding against the transmission of a command to increase power if it is determined that an increase in transmission power at the communication device would not deliver at least a predetermined increase in signal-to-noise ratio at a receiver.

3. The method of claim 1, wherein the deciding also takes into account a level of noise at a receiver that is generated at sources other than the communication device.

4. The method of claim 1, wherein the power control command relates to transmission from the communication device on a physical uplink control channel or on a physical uplink shared channel.

5. The method of claim 1, comprising transmitting the decided power control command to the communication device.

6. The method of claim 5, wherein the power control command is a single-bit command or a 2-bit command.

7. The method of claim 5, wherein the decided power control command is transmitted as part of one of the following sets of information: (i) information used for scheduling of a physical uplink shared channel; and (ii) information used for the scheduling of a physical downlink shared channel codeword.

8. The method of claim 5, comprising transmitting the decided power control command as one of a plurality of power control commands for a physical uplink control channel or a physical uplink shared channel.

9. The method of claim 5, comprising transmitting the decided power control command to the communication device on a physical downlink control channel.

10. The method of claim 1, wherein the decided power control command is used by the communication device in determining an average power over which a single-carrier frequency domain multiple access symbol.

11. An apparatus comprising: a processor and memory including computer program code, wherein the memory and the computer program code are configured to, with the processor, cause the apparatus at least to perform:
    receiving, wirelessly from a communication device, information about a signal transmission distortion characteristic of the communication device, wherein the information indicates how hardware imperfections of the communication device introduce distortion into a transmitted signal; and
    deciding a power control command for wirelessly transmitting to the communication device, wherein the deciding takes into account the signal transmission distortion characteristic of the communication device, wherein the signal distortion characteristic of the communication device defines a maximum signal-to-noise ratio for a signal from the communication device, and comprising deciding against a transmission of a command to increase power if it is determined that a signal-to-noise ratio of a signal received at a receiver from the communication device is already less than a predetermined amount below said maximum, wherein the decided power control command is transmitted as part of downlink control information to the communication device, and wherein the power control command is for use by the communication device in determining a transmission power for the communication device.

12. A computer program product comprising a non-transitory computer-readable medium bearing program code embodied therein which when loaded into a computer controls the computer to perform:

receiving, wirelessly from a communication device, information about a signal transmission distortion characteristic of the communication device, wherein the information indicates how hardware imperfections of the communication device introduce distortion into a transmitted signal; and deciding a power control command for wirelessly transmitting to the communication device, wherein the deciding takes into account the signal transmission distortion characteristic of the communication device, wherein the signal distortion characteristic of the communication device defines a maximum signal-to-noise ratio for a signal from the communication device, and comprising deciding against a transmission of a command to increase power if it is determined that a signal-to-noise ratio of a signal received at a receiver from the communication device is already less than a predetermined amount below said maximum, wherein the decided power control command is transmitted as part of downlink control information to the communication device, and wherein the power control command is for use by the communication device in determining a transmission power for the communication device.

13. A method comprising:

generating a message for sending from a communication device to a radio access network node, wherein the message includes information about a signal transmission distortion characteristic of the communication device, wherein the information indicates how hardware imperfections of the communication device introduce distortion into a transmitted signal, wherein the signal distortion characteristic of the communication device defines a maximum signal-to-noise ratio for a signal from the communication device, wherein the signal transmission distortion characteristic is for use by the radio access network node in deciding a power control command for transmitting to the communication device, wherein the deciding by the radio access network node comprises deciding against a transmission of a command to increase power if it is determined that a signal-to-noise ratio of a signal received at a receiver from the communication device is already less than a predetermined amount below said maximum, and wherein the decided power control command is transmitted as part of downlink control information to the communication device; and sending the message from the communication device to the radio access network node.

14. A computer program product comprising a non-transitory computer-readable medium bearing program code embodied therein which when loaded into a computer controls the computer to perform:

generating a message for sending from a communication device to a radio access network node, wherein the message includes information about a signal transmission distortion characteristic of the communication device, wherein the information indicates how hardware imperfections of the communication device introduce distortion into a transmitted signal, wherein the signal distortion characteristic of the communication device defines a maximum signal-to-noise ratio for a signal from the communication device, wherein the signal transmission distortion characteristic is for use by the radio access network node in deciding a power control command for transmitting to the communication device, wherein the deciding by the radio access network node comprises deciding against a transmission of a command to increase power if it is determined that a signal-to-noise ratio of a signal received at a receiver from the communication device is already less than a predetermined amount below said maximum, and wherein the decided power control command is transmitted as part of downlink control information to the communication device; and sending the message from the communication device to the radio access network node.

15. An apparatus comprising: a processor and memory including computer program code, wherein the memory and the computer program code are configured to, with the processor, cause the apparatus at least to perform:

generating a message for sending from a communication device to a radio access network node, wherein the message includes information about a signal transmission distortion characteristic of the communication device, wherein the information indicates how hardware imperfections of the communication device introduce distortion into a transmitted signal, wherein the signal distortion characteristic of the communication device defines a maximum signal-to-noise ratio for a signal from the communication device, wherein the signal transmission distortion characteristic is for use by the radio access network node in deciding a power control command for transmitting to the communication device, wherein the deciding by the radio access network node comprises deciding against a transmission of a command to increase power if it is determined that a signal-to-noise ratio of a signal received at a receiver from the communication device is already less than a predetermined amount below said maximum, and wherein the decided power control command is transmitted as part of downlink control information to the communication device; and sending the message from the communication device to the radio access network node.

* * * * *